US012316666B2

(12) United States Patent
Kulshreshtha et al.

(10) Patent No.: US 12,316,666 B2
(45) Date of Patent: May 27, 2025

(54) SYSTEMS AND METHODS FOR DERIVING APPLICATION SECURITY SIGNALS FROM APPLICATION PERFORMANCE DATA

(71) Applicant: Cisco Technology, Inc., San Jose, CA (US)

(72) Inventors: Ashutosh Kulshreshtha, Cupertino, CA (US); Walter T. Hulick, Jr., Pearland, TX (US); Chandra Mohan Babu Nadiminti, Dublin, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 322 days.

(21) Appl. No.: 17/704,064

(22) Filed: Mar. 25, 2022

(65) Prior Publication Data
US 2023/0308470 A1 Sep. 28, 2023

(51) Int. Cl.
*H04L 9/40* (2022.01)
(52) U.S. Cl.
CPC ...... *H04L 63/1433* (2013.01); *H04L 63/1416* (2013.01); *H04L 63/1425* (2013.01); *H04L 63/1458* (2013.01); *H04L 63/1483* (2013.01); *H04L 63/20* (2013.01)
(58) Field of Classification Search
CPC ............. H04L 63/1433; H04L 63/1416; H04L 63/1425; H04L 63/1458; H04L 63/1483; H04L 63/20; H04L 9/40
See application file for complete search history.

(56) References Cited

U.S. PATENT DOCUMENTS

| 10,063,654 | B2 * | 8/2018 | Kirti | H04L 67/535 |
|---|---|---|---|---|
| 10,135,862 | B1 | 11/2018 | McClintock et al. | |
| 10,313,211 | B1 * | 6/2019 | Rastogi | H04L 41/142 |
| 10,594,714 | B2 * | 3/2020 | Crabtree | H04L 63/20 |
| 2008/0109730 | A1 * | 5/2008 | Coffman | G06Q 30/02 |
| | | | | 715/733 |
| 2013/0097706 | A1 * | 4/2013 | Titonis | G06F 21/566 |
| | | | | 726/22 |
| 2016/0057166 | A1 | 2/2016 | Chesla | |
| 2017/0272472 | A1 * | 9/2017 | Adhar | G06F 21/602 |
| 2018/0084006 | A1 | 3/2018 | Kwan et al. | |

(Continued)

FOREIGN PATENT DOCUMENTS

CN 114500115 B * 7/2022

OTHER PUBLICATIONS

PCT International Search Report and Written Opinion corresponding to PCT/US2023/015616, dated Jun. 9, 2023, 12 pages.

*Primary Examiner* — Jayesh M Jhaveri
(74) *Attorney, Agent, or Firm* — Baker Botts L.L.P.

(57) ABSTRACT

In one embodiment, a method includes receiving, by a network component, application performance data. The application performance data is associated with one or more applications. The method also includes determining to transform, by the network component, the application performance data into application security data, generating, by the network component, a baseline for the application security data, and detecting, by the network component, an anomaly in the baseline. The method further includes determining, by the network component, a potential security threat based on the anomaly.

20 Claims, 3 Drawing Sheets

(56) References Cited

U.S. PATENT DOCUMENTS

| | | |
|---|---|---|
| 2018/0287907 A1* | 10/2018 | Kulshreshtha .......... H04L 43/04 |
| 2019/0034254 A1 | 1/2019 | Nataraj et al. |
| 2019/0158517 A1 | 5/2019 | Muddu et al. |
| 2020/0067948 A1 | 2/2020 | Baradaran et al. |
| 2021/0133324 A1 | 5/2021 | Chari et al. |
| 2021/0182873 A1 | 6/2021 | Lang et al. |
| 2022/0232042 A1* | 7/2022 | Crabtree ............... G06F 16/951 |

* cited by examiner

SYSTEMS AND METHODS FOR DERIVING APPLICATION SECURITY SIGNALS FROM APPLICATION PERFORMANCE DATA

TECHNICAL FIELD

The present disclosure relates generally to application, and more specifically to systems and methods for deriving application security signals from application performance data.

BACKGROUND

As software applications increasingly become more complex, they become more susceptible to security attacks. Traditional vulnerability scanning for software applications occurs before the applications are launched to production and then may continue on a monthly or quarterly basis. However, as soon as the applications are deployed to production, new security gaps and zero-day exploits may make the applications vulnerable to security attacks despite pre-production testing.

DESCRIPTION OF EXAMPLE EMBODIMENTS

Overview

Figure 1:
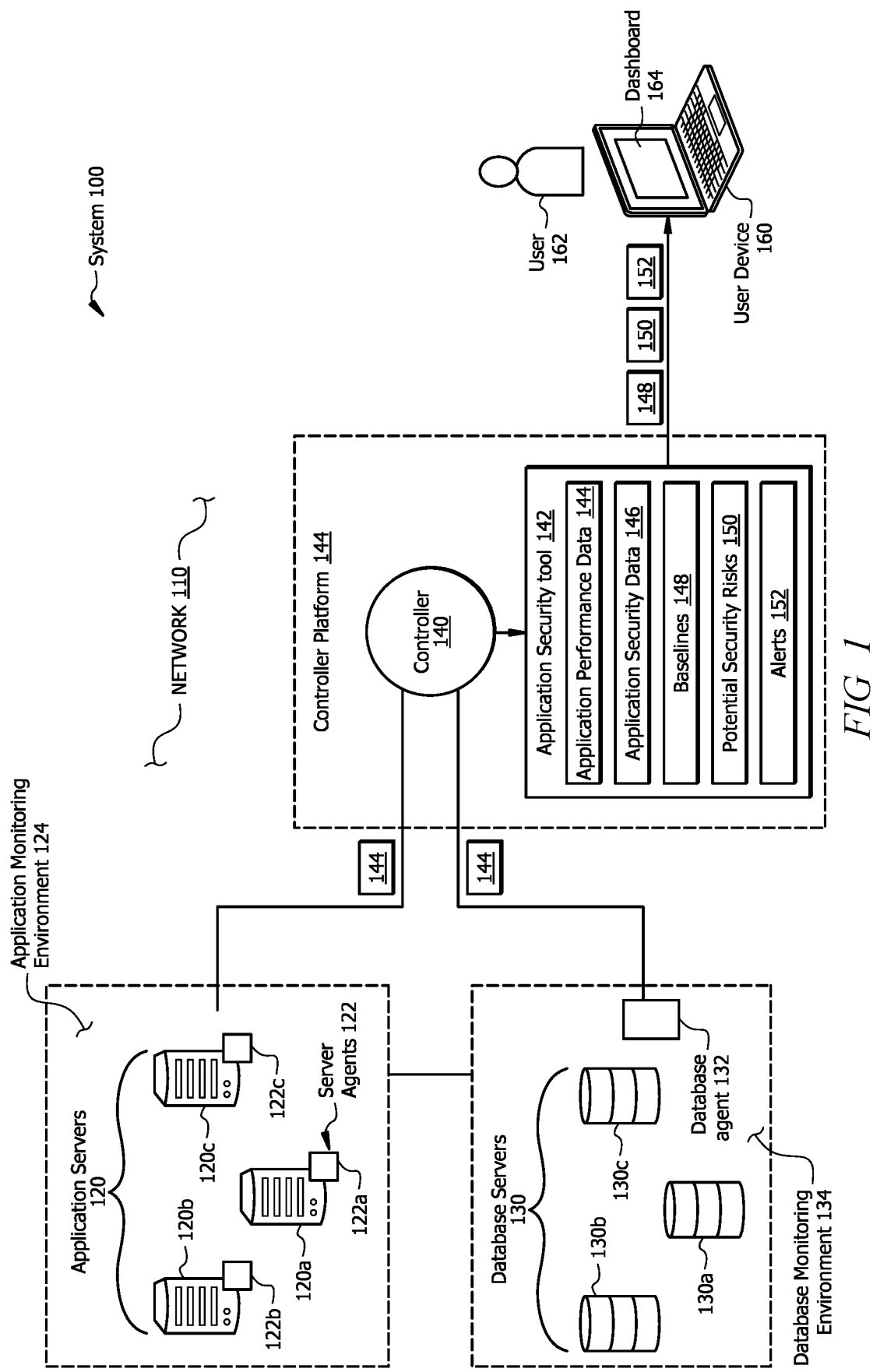
FIG. 1 illustrates an example system for deriving application security signals from application performance data.

According to an embodiment, a network component includes one or more processors and one or more computer-readable non-transitory storage media coupled to the one or more processors and including instructions that, when executed by the one or more processors, cause the network component to perform operations. The operations include receiving application performance data. The application performance data is associated with one or more applications. The operations also include determining to transform the application performance data into application security data, generating a baseline for the application security data, and detecting an anomaly in the baseline. The operations further include determining a potential security threat based on the anomaly. In certain embodiments, the network component is a controller located on-premises or in a software as a service (SaaS) environment.

In certain embodiments, the application performance data includes one or more of the following types of data: application server availability data: transaction latency data; browser type data: source address data: Uniform Resource Locator (URL) data: geolocation data; and login data.

In certain embodiments, determining to transform the application performance data into the application security data includes analyzing the application performance data based on security considerations. In some embodiments, the security considerations include one or more of the following types of potential security threats: a denial-of-service (DoS) attack: a phishing attack: a local file inclusion (LFI) attack; and a remote file inclusion (RFI) attack.

In certain embodiments, the baseline for the application security data is a dynamic baseline over a rolling time period. In some embodiments, the application performance data is real-time application performance data received from one or more agents. In certain embodiments, detecting the anomaly in the baseline includes determining a threshold associated with the baseline and detecting the anomaly if the application security data exceeds the threshold.

According to another embodiment, a method includes receiving, by a network component, application performance data. The application performance data is associated with one or more applications. The method also includes determining to transform, by the network component, the application performance data into application security data, generating, by the network component, a baseline for the application security data, and detecting, by the network component, an anomaly in the baseline. The method further includes determining, by the network component, a potential security threat based on the anomaly.

According to yet another embodiment, one or more computer-readable non-transitory storage media embody instructions that, when executed by a processor, cause the processor to perform operations. The operations include receiving application performance data. The application performance data is associated with one or more applications. The operations also include determining to transform the application performance data into application security data, generating a baseline for the application security data, and detecting an anomaly in the baseline. The operations further include determining a potential security threat based on the anomaly.

Technical advantages of certain embodiments of this disclosure may include one or more of the following. Certain embodiments of this disclosure transform application performance data into application security data to detect, block, and/or report security threats. In some embodiments, key performance metrics generated for application performance monitoring are repurposed to provide insight into the security of the system. Certain embodiments of this disclosure include an application security tool that allows the system to detect security issues in applications. In certain embodiments, application security tool may isolate and/or identify the security issue. Certain embodiments of this disclosure generate notifications to alert, protect, and/or resolve security events depending on the severity. Some embodiments of this disclosure operate in real-time, which provides continuous security monitoring of applications.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for deriving application security signals from application performance data. Certain existing products and services track transactions through an application and determine application performance data such as latency of each service in a network path. The application performance data is useful for determining and isolating application performance issues. In certain embodiments of this disclosure, application security signals are derived from the application performance data, and the application security signals are then to detect security incidents.

FIG. 1 illustrates an example system 100 for deriving application security signals from application performance data. System 100 or portions thereof may be associated with an entity, which may include any entity, such as a business, company, or enterprise, that uses application performance data. In certain embodiments, the entity may be a service provider that provides services for analyzing application performance data. The components of system 100 may include any suitable combination of hardware, firmware, and software. For example, the components of system 100 may use one or more elements of the computer system of FIG. 3. In the illustrated embodiment of FIG. 1, system 100 includes a network 110, application servers 120, application agents 122, an application monitoring environment 124, database servers 130, a database agent 132, a database monitoring environment 134, a controller 140, an application security tool 142, application performance data 144, application security data 146, baselines 148, security threats 150, alerts 152, a controller platform 154, a user device 160, a user 162, and a dashboard 164.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined wide area network (SD-WAN), a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110.

Network 110 may include one or more nodes. Nodes are connection points within network 110 that receive, create, store and/or send data along a path. Nodes may include one or more redistribution points that recognize, process, and forward data to other nodes of network. Nodes may include virtual and/or physical nodes. Nodes may include one or more virtual machines, hardware devices, bare metal servers, and the like. As another example, nodes may include data communications equipment such as computers, routers, servers, printers, workstations, switches, bridges, modems, hubs, and the like. In certain embodiments, nodes use static and/or dynamic routing to send data to and/or receive data to other nodes of system 100. In the illustrated embodiment of FIG. 1, nodes include application servers 120, database servers 130, controller 140, and user device 160.

Application servers 120 (e.g., application server 120a, application server 120b, an application server 120c) of system 100 are servers that host applications. Applications are computer software that perform specific functions. Applications may include web browsers, multimedia software, content access software, enterprise software, database software, and the like. Application servers 120 may include web server connectors, computer programming languages, runtime libraries, database connectors, and/or administration code needed to deploy, configure, manage, and/or connect these components on a web host. In certain embodiments, application servers 120 run behind a web server (e.g., Apache or Microsoft Internet Information Services (IIS)) and/or in front of a Structured Query Language (SQL) database (e.g., PostgreSQL, MySQL, or Oracle). Web applications are computer code which run atop application servers 120 and are written in the language(s) supported by application servers 120. Application servers 120 may include proprietary application servers, Java application servers, Jakarta EE application servers, Windows application servers, PHP: Hypertext Preprocessor (PHP) application servers, mobile application servers, and the like. In the illustrated embodiment of FIG. 1, application agents 122 are installed on application servers 120. Specifically, application agent 122a is installed on application server 120a, application agent 122b is installed on application server 120b, and application agent 122c is installed on application server 120c.

Application agents 122 (e.g., application agent 122a, application agent 122b, and application agent 122c) of system 100 collect information about the performance of the monitored systems (e.g., application performance data 144) of application monitoring environment 124. In certain embodiments, application agents 122 run in application processes and apply code-level instrumentation to the applications. In some embodiments, application agents 122 include plug-ins and/or extensions that monitor the performance of application code, runtime, and/or behavior. Application agents 122 may be deployed in devices, containers, hosts, applications, etc. Application agents 122 may include one or more Java agents, .NET agents, Node.js agents, PHP agents, Python agents, serverless Amazon Web Services (AWS) Lambda agents, Apache Web server agents, C/C++ SDK agents, Go Language agents, IBM Integration Bus Agents, machine agents, and the like. Machine agents collect application performance data 144 about machine performance. The machines (real or virtual) constitute the hardware and operating system on which the applications run.

In the illustrated embodiment of FIG. 1, application servers 120 (e.g., application server 120a, application server 120b, an application server 120c) and application agents 122 (e.g., application agent 122a, application agent 122b, and application agent 122c) reside in application monitoring environment 124. Application monitoring environment 124 of system 100 may include multiple, distributed, and interconnected application servers 120 and processes, which allows system 100 to track transactions across distributed, heterogenous services.

Database servers 130 (e.g., database server 130a, database server 130b, and database server 130c) of system 100 are servers that use database applications to provide database services to other computer programs or network components of system 100. Database applications respond to a query language. In certain embodiments, each database server 130 understands its query language, converts each submitted query to server-readable form, and executes it to retrieve results. Database applications may include proprietary database applications (e.g., Oracle, Db2, Informix, Microsoft SQL Server, etc.) and/or free software database applications (e.g., PostgreSQL, Ingres, MySQL, etc.). In certain embodiments, each database server 130 uses its own query logic and structure.

Database agent 132 collects information about the performance of the monitored systems (e.g., application performance data 144) of database monitoring environment 134. In certain embodiments, database agent 132 is a program (e.g., a standalone Java program) that collects performance metrics about database instances and database servers 130. Database agent 132 may be a Simple Network Management Protocol (SNMP) agent, a Java agent, a MySQL agent, an Oracle agent, a Db2 agent, an Informix agent, a Microsoft agent, a machine agent, and the like. In certain embodiments, a database collector is configured for each database server 130. The database collector is a process that runs within database agent 132 to collect performance metrics about database instances and database servers 130.

In the illustrated embodiment of FIG. 1, database servers 130 and database agent 132 reside in database monitoring environment 134. Database monitoring environment 134 system 100 may include multiple, distributed, and interconnected database servers 130 and processes, which allows system 100 to monitor key performance metrics such as resource consumption, database objects, schema statistics, etc.

In certain embodiments, application agents 122 of application monitoring environment 124 and/or database agent 132 of database monitoring environment 134 collect application performance data 144. Application performance data 144 are key performance indicators that quantifiably measure performance for particular objectives. Application performance data 144 may include application availability metrics. Application server availability metrics indicate the availability of application servers 120. Application servers 120 are considered available if they are reporting application performance data 144 to controller 140. If one or more application servers 120 are running on more than one node, this metric may reflect how many nodes the application servers 120 were running on. When one or more application servers 120 shut down or crash, then its application server availability metric decreases.

Application performance data 144 may include number of requests metrics (e.g., number of completed requests, number of active requests, number of requests per second over a predetermined time interval (e.g., 1, 5, or 15 minutes)); number of forbidden requests metrics (e.g., number of forbidden URLs); port connect attempt metrics (number of port connection attempts within a predetermined time interval); no user login metrics (number of users accessing system 100 with no login credentials); http: URL metrics (number of http: URL requests); login failure metrics (number of login failures); geolocation metrics; change in URL use metrics; security exceptions in snapshots metrics; script contents in URL metrics; large transfers metrics; deployment locations (e.g., subnets, tiers, etc.) metrics, transaction latency metrics: Web content access metrics, web browser type metrics, host metrics (e.g., Windows, Linux, etc.), Internet Protocol (IP) address metrics, bandwidth metrics, jitter metrics, and the like.

Application performance data 144 may include block time/average block time metrics (average wait time to get a lock, wherein a high block time means there is often contention for the lock required for a thread to work on an object); call volume metrics (the total number of invocations of the entry point for all instances of the business transaction during the specified time from the node to the destination displayed); calls per minute metrics (the average number of incoming or outgoing calls per minute during the specified time from the node to their destination); central processing unit (CPU) usage metrics (the amount of time the virtual machine used the CPU to process transactions monitored by the agent); error detection metrics (unhandled exceptions and any exception that prevents a business transaction from completing successfully are counted as errors); response time metrics (average response time (ART) spent processing the business transaction or call); slow transactions metrics (number of instances that meet the predetermined criteria for a slow transaction); stalled transactions metrics (number of instances that meet the predetermined criteria defined for a stalled transaction (e.g., takes more than 45 seconds to finish)); wait time metrics (average time spent when invocations are in a thread sleep or wait state), HTTP error code metrics (includes all HTTP calls done outside of a web service call that produced an error); average request size metrics (HTTP request content length for each business transaction); and the like.

Application performance data 144 may include business transaction metrics. Business transaction metrics are metrics related to a particular business application. Business transaction metrics may include percentage of slow transactions metrics (percentage of instances that are slow over the selected time frame); percentage of stalled transactions metrics (percentage of instances that stalled over the selected time frame); percentage of very slow transactions metrics (e.g., percentage of instances that are very slow over the selected time frame); percentage of errors metrics (percentage of instances of this business transaction that are errors); maximum response time metrics (longest time spent processing an instance); minimum response time metrics (shortest time spent processing an instance); tier metrics (name of the originating tier for the business transaction); type metrics (type of app agent (e.g., Java, .NET, PHP, etc.); and the like.

Application performance data 144 may include performance data specific to database monitoring environment 134. For example, application performance data 144 may include calls per minute metrics (e.g., the number of SQL calls to database servers 130 per minute); database availability metrics (e.g., the times when database servers 130 are available (or have an active connection); number of connections metrics (e.g., the number of connections established with database servers 130 at any point during the selected time period); time spent in execution metrics (e.g., the current amount of time database servers 130 spent executing SQL statements); total database size metrics (e.g., the amount of disk space database servers 130 are using); total lock time metrics (e.g., the total time database servers 130 were in lock state); memory usage metrics (e.g., percentage of CPU used by the user/system); number of requests metrics (e.g., number of completed requests, number of active requests, number of request per second over a predetermined time interval (e.g., 1, 5, or 15 minutes)); and the like.

Controller 140 of system 100 analyzes application performance data 144 received from application monitoring environment 124 and/or database monitoring environment 134. Controller 140 may store, baseline, and/or analyze application performance data 144. In certain embodiments, controller 140 is designed for large-scale production environments. For example, controller 140 may scale to manage hundreds to thousands of application servers 120 and/or database servers 130. In some embodiments, controller 140 receives application performance data 144 in real-time. Controller 140 may assemble and/or process application performance data 144. In certain embodiments, controller 140 sends instructions to application agents 122 of application monitoring environment 124 and/or database agent 132 of database monitoring environment 134. For example, controller 140 may determine that certain types of application performance data 144 (e.g., number of requests metrics, application availability metrics, etc.) are relevant to security considerations and specifically request those types of application performance data 144 from application monitoring environment 124 and/or database agent 132 of database monitoring environment 134.

Application security tool 142 of system 100 is a software program used by controller 140 to transform application performance data 144 into application security data 146. Application security data 146 of system 100 is any data that may be used to identify potential security threats 150. Security threats 150 are malicious acts designed to harm applications associated with system 100. Security threats 150 may include potential DoS attacks, distributed DoS (DDoS) attacks (e.g., botnets, Smurf attacks, Transmission Control Protocol (TCP) synchronize (SYN) flood attacks, etc.), social engineering attacks (e.g., phishing, spear phishing, and homograph attacks), malware attacks (e.g., spyware, ransomware, viruses, worms, etc.), SQL injections, password attacks, local file inclusion (LFI) attacks, remote file inclusion (RFI) attacks, and the like. In certain embodiments, application security data 146 comprises application security signals that are used to identify and/or isolate security threats 150. In some embodiments, application security signals are used to perform actions to reduce or eliminate security concerns to system 100.

Application security tool 142 analyzes application performance data 144 and determines whether application performance data 144 can be used to identify potential security threats 150. In certain embodiments, application security tool 142 determines that certain types of application performance data 144 are relevant to one or more security considerations and repurposes those types of application performance data 144 into application security data 146. For example, a no user login metric may indicate unauthenticated users on system 100; http: URL metrics may indicate non-encrypted communications: login failure metrics may identify that an application performance management tool attempted to access a user account, which may indicate a potential inside job: geolocation metrics may identify logins or login attempts from new locations, locations with poor geolocation reputation scores, and/or locations on a block list: change in URL use metrics may indicate potential penetration attempts for certain transactions: security exceptions in snapshots metrics may indicate runtime security issues: script contents in URL metrics may indicate potential cross-site scripting (XSS) attacks; large transfers metrics may indicate a data loss prevention (DLP) issue: transaction latency metrics may indicate a DDoS attack; and web content access metrics may indicate an LFI attack and/or an RFI attack.

In certain embodiments, application security tool 142 may analyze a combination of different types of application performance data 144 to determine whether application performance data 144 can be used to identify potential security threats 150. For example, transaction latency metrics may be considered in combination with geolocation metrics. While an increase in the transaction latency (e.g., twenty percent) alone may not initiate a security concern, an increase in the transaction latency metric in combination with a poor geolocation reputation will trigger a security concern.

In certain embodiments, application security tool 142 may use one or more baselines 148 to determine potential security threats 150 based on application security data 146. Baselines 148 of system 100 are used to benchmark normal behavior for applications of system 100. In certain embodiments, application security tool 142 generates baselines 148 for application security data 146. In certain embodiments, application security tool 142 automatically calculates dynamic baselines 148 using machine learning. Through baselines 148, application security tool 142 may define what is normal application performance data 144 and/or application security data 146. In certain embodiments, application security tool 142 may use baselines 148 to identify subsequent application security data 146 whose values fall out of this normal range. In some embodiments, application security tool 142 may establish security rules against normal baselines 148 to track non-optimal conditions and detect potential security threats 150.

In certain embodiments, application security tool 142 associates a threshold with each baseline 148. A threshold is a boundary of acceptable or normal performance from a security standpoint. In some embodiments, thresholds are used to define acceptable high and low values for performance security data 146, which are different than the thresholds used to define acceptable high and low values for application performance data 144. In certain embodiments, application security tool 142 may use thresholds to identify anomalies in baselines 148. For example, application security tool 142 may identify an anomaly in the number of requests metrics if the number of requests exceed a predetermined threshold. As another example, application security tool 142 may detect an anomaly the forbidden requests metrics if the number of forbidden URL requests exceeds a predetermined threshold. As still another example, application security tool 142 may detect an anomaly in the port connect attempt metrics if the number of port connection attempts exceed a predetermined threshold. As yet another example, application security tool 142 may detect an anomaly in the large transfers metrics if the transfer size exceeds a predetermined threshold.

In certain embodiments, application security tool 142 determines potential security threats 150 by detecting anomalies in baselines 148. For example, an anomaly in the number of requests metrics (e.g., an uptick) may indicate an attempted DoS attack: an anomaly in the number of forbidden request metrics (e.g., an uptick) may indicate phishing to the site; an anomaly in the port connect attempt metrics may identify port scanning, which may indicate phishing to the site; and so on. In some embodiments, application security tool 142 determines potential security threats 150 by detecting anomalies in baselines 148 that use a combination of different types of application security data 146. For example, application security tool 142 may determine an anomaly for a combination of the number of forbidden request metrics and the port connect attempt metrics, which may indicate a phishing attack when considered in combination but may not raise a security concern when considered independently.

Controller platform 154 of system 100 is the environment in which controller 140 and application security tool 142 are executed. In certain embodiments, controller platform 154 is a software as a service (SaaS) environment. In an SaaS environment, controller 140 and application security tool 142 are hosted and maintained by a third-party provider. In some embodiments, controller platform 154 is an on-premises environment. In an on-premises environment, controller 140 and application security tool 142 are hosted in-house.

In certain embodiments, application security tool 142 of controller platform 154 generates alerts 152 based on potential security threats 150. Alerts 152 are notifications or other types of actions based on configured conditions. In certain embodiments, application security tool 142 generates conditions that use baselines 148, thresholds, and/or anomalies to trigger alerts 152 or kick off other types of remedial actions when potential security threats 150 are detected. In certain embodiments, application security tool 142 generates conditions and/or policies to connect potential security threats 150 with actions, that can, for example, trigger alerts 152 or remedial behavior. Remedial behavior may include isolating certain applications, installing firewalls, automatically blocking threats in real-time, and the like. In certain embodiments, application security tool 142 communicates information to user device 160. For example, application security tool 142 may communicate baselines 148, potential security threats 150, and/or alerts 152 to user device 160.

User device 160 of system 100 includes any user equipment that can receive, create, process, store, and/or communicate information. User device 160 may include one or more workstations, desktop computers, laptop computers, mobile phones (e.g., smartphones), tablets, personal digital assistants (PDAs), wearable devices, and the like. In certain embodiments, user device 160 includes a liquid crystal display (LCD), an organic light-emitting diode (OLED) flat screen interface, digital buttons, a digital keyboard, physical buttons, a physical keyboard, one or more touch screen components, a graphical user interface (GUI), and/or the like. User device 160 may be located in any suitable location to receive and communicate information to user 162 of system 100.

User 162 of system 100 is a person or group of persons who utilizes user device 160 of system 100. User 162 may be associated with one or more accounts. User 162 may be a local user, a remote user, an administrator, a customer, a company, a combination thereof, and the like. User 162 may be associated with a username, a password, a user profile, etc.

Dashboard 164 of system 100 is an application security management tool that allows user 162 to visualize any security issues associated with application monitoring environment 124 and/or database monitoring environment 134. In certain embodiments, dashboard 164 provides an overall security view of one or more applications that allows user 162 to quickly determine if any part of application monitoring environment 124 and/or database monitoring environment 134 is susceptible to security threats 150. Dashboard 164 may display one or more graphs, charts, tables, lists, or any other suitable format to represent the security of one or more applications of system 100. In certain embodiments, dashboard 164 provides a visual representation of one or more baselines 148, security threats 150, and/or alerts 152 to user 162.

In operation, application agents 122 are installed on application servers 120 within application monitoring environment 124, and database agent 132 is deployed on a machine in database monitoring environment 134. Application agents 122 and/or database agent 132 collect application performance data 144 and communicate application performance data 144 to controller 140. Controller 140 of system 100 uses application security tool 142 to analyze application performance data 144 received from application agents 122 and database agent 132. Application security tool 142 transforms application performance data 144 into application security data 146 based on security considerations. Application security tool 142 generates baseline 148 for one or more types of application security data 146 and determines a threshold associated with baseline 148. If application security data 146 exceeds the predetermined threshold, application security tool 142 detects an anomaly in baseline 148. The anomaly indicates potential security threat 150 to an application of application monitoring environment 124 or database monitoring environment 134. As such, application security tool 142 is able to repurpose application performance data 144 as application security data 146 to increase the security awareness of system 100.

Although FIG. 1 illustrates a particular number of networks 110, application servers 120, application agents 122, application monitoring environments 124, database servers 130, database agents 132, database monitoring environments 134, controllers 140, application security tools 142, application performance data 144, application security data 146, baselines 148, security threats 150, alerts 152, controller platforms 154, user devices 160, users 162, and dashboards 164, this disclosure contemplates any suitable number of networks 110, application servers 120, application agents 122, application monitoring environments 124, database servers 130, database agents 132, database monitoring environments 134, controllers 140, application security tools 142, application performance data 144, application security data 146, baselines 148, security threats 150, alerts 152, controller platforms 154, user devices 160, users 162, and dashboards 164. For example, system 100 may include more than one database agent 132.

Although FIG. 1 illustrates a particular arrangement of network 110, application servers 120, application agents 122, application monitoring environment 124, database servers 130, database agent 132, database monitoring environment 134, controller 140, application security tool 142, application performance data 144, application security data 146, baselines 148, security threats 150, alerts 152, controller platform 154, user device 160, user 162, and dashboard 164, this disclosure contemplates any suitable arrangement of network 110, application servers 120, application agents 122, application monitoring environment 124, database servers 130, database agent 132, database monitoring environment 134, controller 140, application security tool 142, application performance data 144, application security data 146, baselines 148, security threats 150, alerts 152, controller platform 154, user device 160, user 162, and dashboard 164. For example, user device 160 and/or controller 140 may be located in application monitoring environment 124 or database monitoring environment 134.

Furthermore, although FIG. 1 describes and illustrates particular components, devices, or systems carrying out particular actions, this disclosure contemplates any suitable combination of any suitable components, devices, or systems carrying out any suitable actions.

Figure 2:
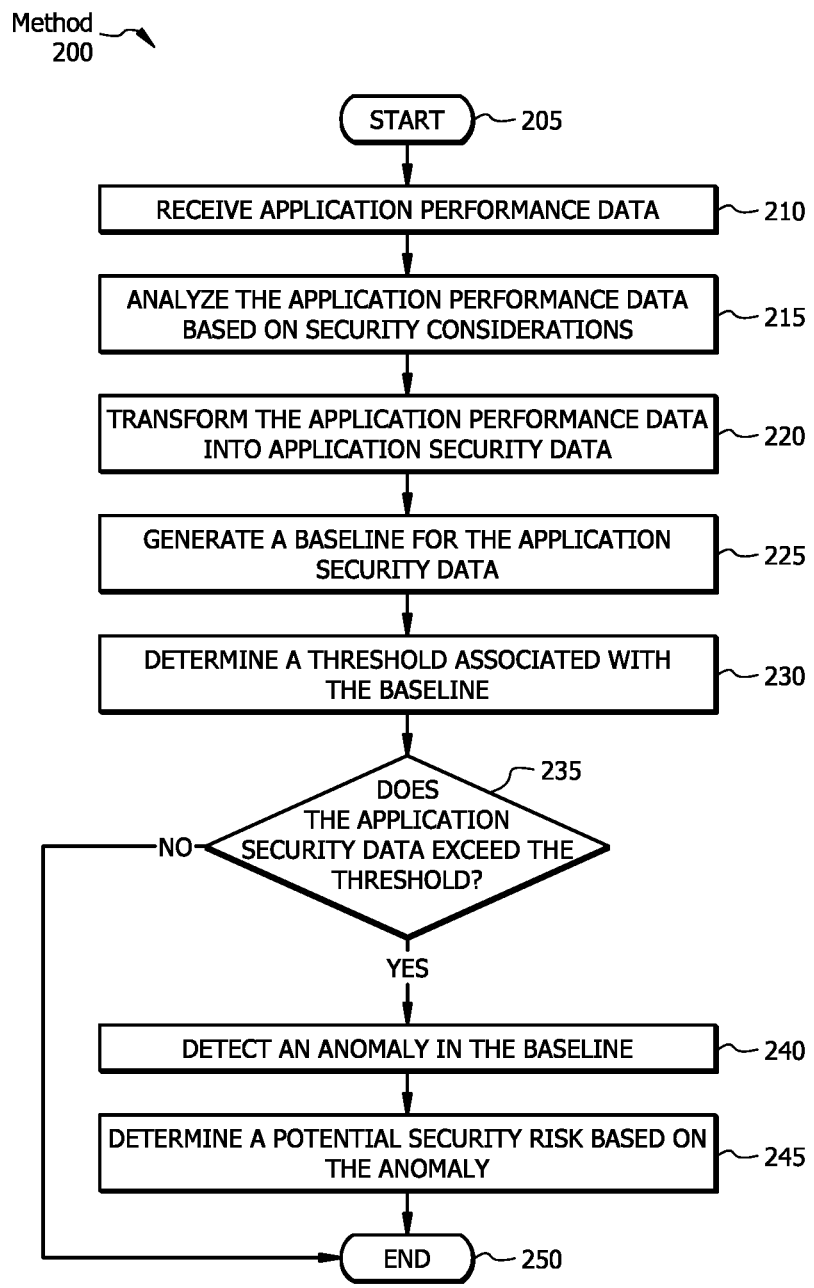
FIG. 2 illustrates an example method for deriving application security signals from application performance data.

FIG. 2 illustrates an example method 200 for deriving application security signals from application performance data. Method 200 begins at step 205. At step 210 of method 200, a controller receives application performance data. For example, referring to FIG. 1, controller 140 of system 100 may receive application performance data 144 from application agents 122 of application monitoring environment 124 and/or database agent 132 of database monitoring environment 134. Application performance metrics may include application server availability metrics, database availability metrics, number of requests metrics, number of forbidden requests metrics, port connect attempt metrics, no user login metrics, login failure metrics, geolocation metrics, change in URL use metrics, large transfers metrics, transaction latency metrics, Web content access metrics, and the like. Method 200 then moves from step 210 to step 215.

At step 215 of method 200, the controller analyzes the application performance data based on security considerations. For example, referring to FIG. 1, application security tool 142 of controller 140 may analyze application performance data 144 based on potential security threats 150 to applications of system 100. In certain embodiments, the application security tool may analyze a combination of different types of application performance data to determine whether application performance data can be used to identify potential security threats. Method 200 then moves from step 215 to step 220.

At step 220 of method 200, the application security tool determines to transform the application performance data into application security data. Referring to FIG. 1, application security tool 142 may determine that certain types of application performance data 144 are relevant to security considerations and repurpose those types of application performance data 144 into application security data 146. For example, application performance data such as no user login metrics may indicate unauthenticated users and be repurposed as application security data. As another example, application performance data such as http: URL metrics may indicate non-encrypted communications and may be repurposed as application security data. As still another example, application performance data such as geolocation metrics may identify logins or login attempts from new locations or locations with poor geolocation reputations and be repurposed as application security data. Method 200 then moves from step 220 to step 225.

At step 225 of method 200, the application security tool generates a baseline for the application security data. Referring to FIG. 1, application security tool 142 may automatically generate baseline 148 for application security data 146 using machine learning. Through baselines, application security tool may define what is normal application security data. In certain embodiments, the application security tool generates a baseline for each type of application security data (e.g., no user login metrics, http: URL metrics, and geolocation metrics). In some embodiments, the application security tool generates a baseline for a particular combination of application security data (e.g., transaction latency metrics and geolocation metrics). Method 200 then moves from step 225 to step 230.

At step 230 of method 200, the application security tool determines a threshold associated with the baseline. Thresholds may be used to define acceptable high and low values for performance security data. Referring to FIG. 1, application security tool 142 may determine a threshold (e.g., a maximum acceptable threshold for upticks in data) associated with each baseline 148 for one or more types of application security data 146 or one or more combinations of application security data 146. Method 200 then moves from step 230 to step 235.

At step 235 of method 200, the application security tool determines whether the application security data exceeds the predetermined threshold. For example, referring to FIG. 1, application security tool 142 may determine whether application security data 146 associated with a number of requests metric and/or a number of forbidden requests metric exceeds a predetermined threshold. If the application security tool determines that the application security data does not exceed the threshold, method 200 advances from step 235 to step 250, where method 200 ends. If, at step 235, the application security tool determines that the application security data exceeds the threshold, method 200 moves from step 235 to step 240, where the application security tool detects an anomaly in the baseline. Method 200 then moves from step 240 to step 245.

At step 245 of method 200, the application security tool determines a potential security threat based on the anomaly. For example, referring to FIG. 1, application security tool 142 may determine potential security threat 150 such as an attempted DoS attack based on an anomaly (e.g., an uptick exceeding the predetermined threshold) in the number of requests metric. As another example, referring to FIG. 1, application security tool 142 may determine potential security threat 150 (e.g., phishing to the site) based on an anomaly (e.g., an uptick exceeding the predetermined threshold) in the number of forbidden requests metric. As still another example, referring to FIG. 1, application security tool 142 may determine potential security threat 150 (e.g., a DDoS attack) based on an anomaly (e.g., a 20 percent uptick) in the transaction latency metric in combination with the source of the requests having a geolocation with a low reputation score. Method 200 then moves from step 245 to step 250, where method 200 ends. As such, by deriving application security signals from application performance data, method 200 increases the security awareness of the applications of one or more environments, which may be used to reduce or prevent future security attacks.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method 200 for deriving application security signals from application performance data including the particular steps of the method of FIG. 2, this disclosure contemplates any suitable method for deriving application security signals from application performance data, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
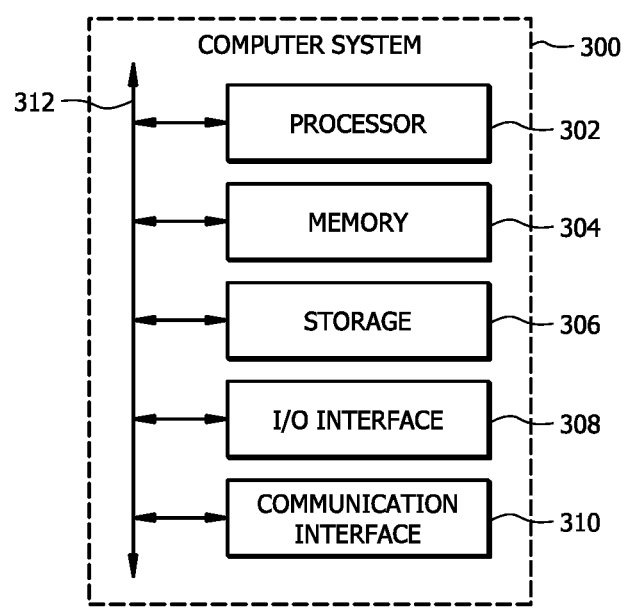
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300: be unitary or distributed: span multiple locations: span multiple machines: span multiple data centers: or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on: the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network component comprising one or more processors and one or more computer-readable non-transitory storage media coupled to the one or more processors and including instructions that, when executed by the one or more processors, cause the network component to perform operations comprising:
   receiving application performance data, wherein the application performance data is associated with one or more applications;
   analyzing the application performance data based at least on the following security considerations:
      a denial-of-service (DoS) attack;
      a phishing attack;
      a local file inclusion (LFI) attack; and
      a remote file inclusion (RFI) attack;
   determining to transform the application performance data into application security data, wherein determining to transform the application performance data into the application security data comprises using a plurality of metrics that indicate a plurality of potential security threats;
   generating a baseline for the application security data;
   detecting an anomaly in the baseline; and
   determining a potential security threat based on the anomaly.

2. The network component of claim 1, wherein the application performance data comprises one or more of the following types of data:
   application server availability data;
   transaction latency data;
   browser type data;
   source address data;
   Uniform Resource Locator (URL) data;

geolocation data; and
login data.

3. The network component of claim 1, wherein:
determining to transform the application performance data into the application security data comprises:
using no user login metrics to indicate unauthenticated users;
using URL metrics to indicate non-encrypted communications;
using geolocation metrics to identify logins or login attempts from new locations; and
using the geolocation metrics to identify logins or login attempts from locations with poor geolocation reputations.

4. The network component of claim 1, wherein the baseline for the application security data is a dynamic baseline over a rolling time period.

5. The network component of claim 1, wherein the application performance data is real-time application performance data received from one or more agents.

6. The network component of claim 1, wherein detecting the anomaly in the baseline comprises:
determining a threshold associated with the baseline; and
detecting the anomaly if the application security data exceeds the threshold.

7. The network component of claim 1, wherein:
the network component is a controller; and
the controller is located on-premises or in a software as a service (SaaS) environment.

8. A method, comprising:
receiving, by a network component, application performance data, wherein the application performance data represent key performance indicators associated with one or more applications;
analyzing the application performance data based at least on the following security considerations:
a denial-of-service (DoS) attack;
a phishing attack;
a local file inclusion (LFI) attack; and
a remote file inclusion (RFI) attack;
determining to transform the application performance data into application security data, wherein determining to transform the application performance data into the application security data comprises using a plurality of metrics that indicate a plurality of potential security threats;
generating, by the network component, a baseline for the application security data;
detecting, by the network component, an anomaly in the baseline; and
determining, by the network component, a potential security threat based on the anomaly.

9. The method of claim 8, wherein the application performance data comprises one or more of the following types of data:
application server availability data;
transaction latency data;
browser type data;
source address data;
Uniform Resource Locator (URL) data;
geolocation data; and
login data.

10. The method of claim 8, wherein:
determining to transform the application performance data into the application security data comprises:
using no user login metrics to indicate unauthenticated users;
using URL metrics to indicate non-encrypted communications;
using geolocation metrics to identify logins or login attempts from new locations; and
using the geolocation metrics to identify logins or login attempts from locations with poor geolocation reputations.

11. The method of claim 8, wherein the baseline for the application security data is a dynamic baseline over a rolling time period.

12. The method of claim 8, wherein the application performance data is real-time application performance data received from one or more agents.

13. The method of claim 8, wherein detecting the anomaly in the baseline comprises:
determining a threshold associated with the baseline; and
detecting the anomaly if the application security data exceeds the threshold.

14. The method of claim 8, wherein:
the network component is a controller; and
the controller is located on-premises or in a software as a service (SaaS) environment.

15. One or more computer-readable non-transitory storage media embodying instructions that, when executed by a processor, cause the processor to perform operations comprising:
receiving application performance data, wherein the application performance data represent key performance indicators associated with one or more applications;
analyzing the application performance data based at least on the following security considerations:
a denial-of-service (DoS) attack;
a phishing attack;
a local file inclusion (LFI) attack; and
a remote file inclusion (RFI) attack;
transforming the application performance data into application security data, wherein transforming the application performance data into the application security data comprises using a plurality of metrics that indicate a plurality of potential security threats;
generating a baseline for the application security data;
detecting an anomaly in the baseline; and
determining a potential security threat based on the anomaly.

16. The one or more computer-readable non-transitory storage media of claim 15, wherein the application performance data comprises one or more of the following types of data:
application server availability data;
transaction latency data;
browser type data;
source address data;
Uniform Resource Locator (URL) data;
geolocation data; and
login data.

17. The one or more computer-readable non-transitory storage media of claim 15, wherein:
transforming the application performance data into the application security data comprises:
using no user login metrics to indicate unauthenticated users;
using URL metrics to indicate non-encrypted communications;
using geolocation metrics to identify logins or login attempts from new locations; and using the geolocation metrics to identify logins or login attempts from locations with poor geolocation reputations.

18. The one or more computer-readable non-transitory storage media of claim 15, wherein the baseline for the application security data is a dynamic baseline over a rolling time period.

19. The one or more computer-readable non-transitory storage media of claim 15, wherein the application performance data is real-time application performance data received from one or more agents.

20. The one or more computer-readable non-transitory storage media of claim 15, wherein detecting the anomaly in the baseline comprises:
   determining a threshold associated with the baseline; and
   detecting the anomaly if the application security data exceeds the threshold.

\* \* \* \* \*